Nov. 18, 1958  K. WILFERT  2,860,567
HEATING AND VENTILATING SYSTEM FOR MOTOR VEHICLES
Filed June 30, 1954  2 Sheets-Sheet 1
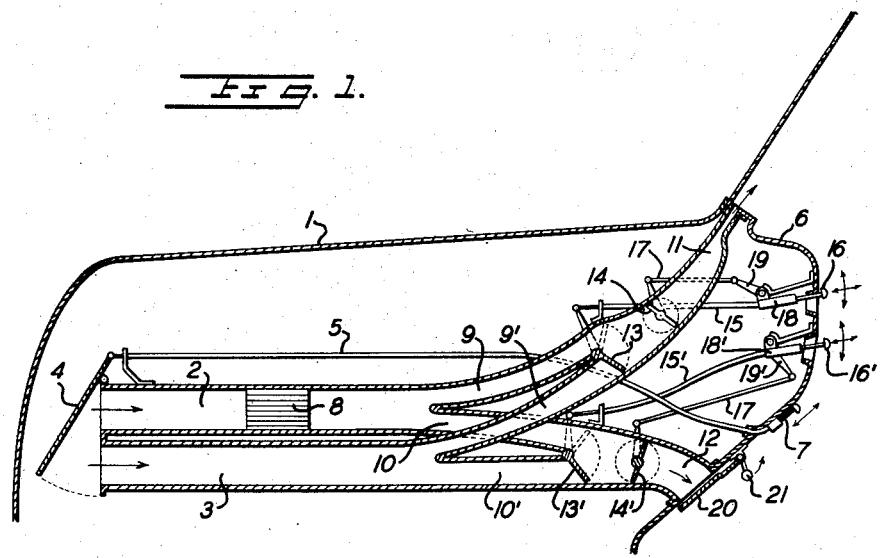
Fig. 1.
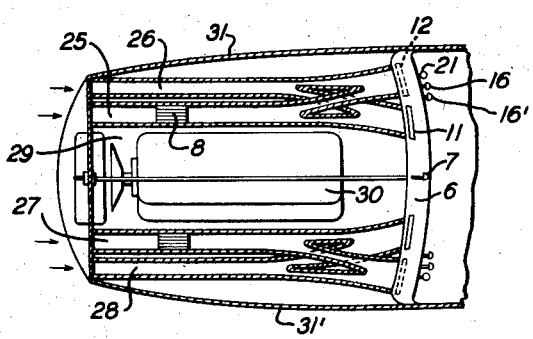
Fig. 2.
Fig. 3.
INVENTOR.
KARL WILFERT
BY Dicke & Craig
ATTORNEYS Nov. 18, 1958          K. WILFERT          2,860,567
HEATING AND VENTILATING SYSTEM FOR MOTOR VEHICLES
Filed June 30, 1954          2 Sheets-Sheet 2
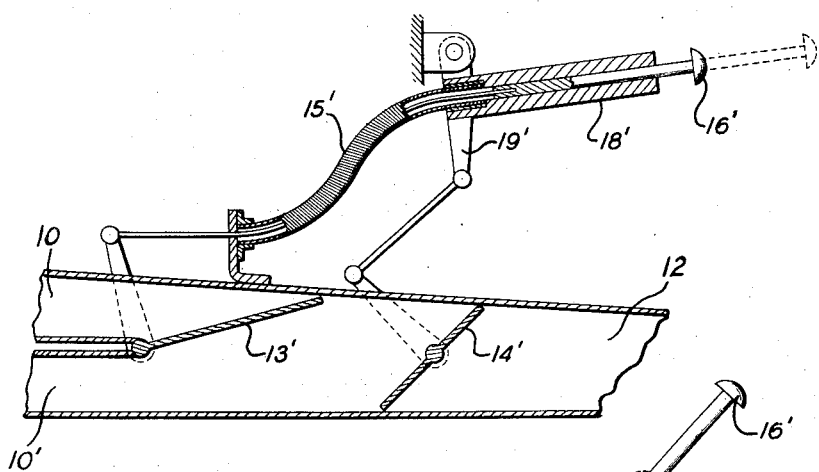
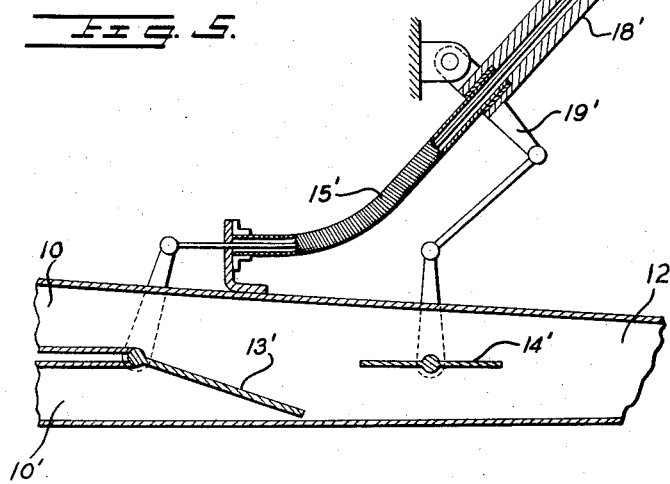
INVENTOR.
KARL WILFERT
BY *Dicke & Craig*
ATTORNEYS 2,860,567
Patented Nov. 18, 1958

2,860,567

HEATING AND VENTILATING SYSTEM FOR MOTOR VEHICLES

Karl Wilfert, Stuttgart-Degerloch, Germany, assignor to Daimler-Benz Aktiengesellschaft, Stuttgart-Unterturkheim, Germany Application June 30, 1954, Serial No. 440,417

Claims priority, application Germany July 2, 1953

11 Claims. (Cl. 98—2)

The present invention relates to ventilating and heating systems for motor vehicles, and more particularly to the combination of such systems so as to cooperate with each other.

Heating and ventilating systems for automobiles have been known in many different designs, and particularly of the type in which two air channels extend along either side of the engine and terminate in front of the passenger compartment in a cross channel from which the air is subsequently distributed to the interior of the car. If systems of this type are also used, as is commonly true both for defrosting windows as well as for heating and ventilating the floor area of the car, they usually have the disadvantage that the air supply cannot be differently adjusted in accordance with the difference in use of the respective outlets. Also, such prior systems do not permit the ventilation and heat to be adapted to certain particular requirements such as for a current of air to pass only along one side of the interior of the car or of heating one side of the car more intensely and with warmer air than the other because the different passengers therein might have different needs for heat and ventilation.

It is the principal object of the present invention to overcome these deficiencies of prior designs and to provide a separate heating and ventilating system for each side of a car so that each system can be controlled and regulated independently of the other.

Another object of the invention is to provide a heating and ventilating system as described which permits independent regulation of one or more window defrosters as well as of a ventilation system for the floor area of the car.

A feature of the invention resides in designing the heating and ventilating systems of an automobile or similar motor vehicle so that each of the two systems permits a separate regulation of the amount of fresh air entering therein as well as of a mixture of warm and cold air for the defrosters and, separately therefrom, for the floor area of the car, and also an independent control of the distribution of the entire air current toward the defrosters and the floor area of the car.

Further objects, features, and advantages of the present invention will appear from the following detailed description and the accompanying diagrammatic drawings of two specific embodiments thereof, in which:

Fig. 1 shows a partial longitudinal section through a motor vehicle provided with a heating and ventilating system for one side thereof;

Fig. 2 is a fragmentary section showing parts of the heating and ventilating system shown in Fig. 1 in a differently adjusted position; while Fig. 3 shows a top view of the front portion of a motor vehicle with the engine hood removed therefrom and illustrating a second embodiment of the invention.

Figure 4 is an enlarged fragmentary section of part of the system of Figure 1, and Figure 5 is a section similar to Figure 4 with apparatus in another adjusted position.

Referring particularly to Fig. 1 of the drawings, the new heating and ventilating system comprises two superimposed air channels 2 and 3 on one side of the car 1, and preferably extending laterally along the engine (not shown) and below the hood thereof. The ventilating air is adapted to enter both channels 2 and 3 through a common air flap 4 mounted at the front openings of these channels and operated through a Bowden wire 5 by a control 7 mounted on the dashboard 6 of the car. The upper air channel 2 serves as a heating air channel and therefore contains a heat exchanger 8 of any suitable design which absorbs in the usual manner the heat of the engine or of the cooling water thereof and transmits it to the channel 2. Each of the two air channels 2 and 3 then branch off toward the interior of the car into an upper branch conduits 9 and 9', respectively, and a lower branch conduits 10 and 10', respectively, the two upper branches 9 and 9' of which merge into a single combining conduit leading to a common defroster nozzle outlet 11 on the inside of the windshield, while the two lower branches 10 and 10' merge into a single combining conduit leading to a common heating and ventilating opening outlet 12 directed toward the floor area of the interior of the car.

By branching the channels 2 and 3 as described, the two heating and ventilating openings of the passenger compartment may be used independently of each other to supply either cold or preheated fresh air through control flaps 13 and 13' located at the points of mergers of branches 9, 9' and 10, 10' respectively and dampers 14 and 14'. The control flaps 13 and 13', respectively, may be operated through Bowden wires 15 and 15' by control rods 16 and 16' to vary the relative amounts of cold and preheated air passing through the nozzle 11 and ventilating opening 12, while the dampers 14 and 14', respectively, may be operated by connecting rods 17 and 17' to control the total amount of air passing through the nozzle 11 and the ventilating opening 12. In order to facilitate the manipulation of the individual controls and avoid too many separate control elements on the dashboard, the sleeves 18 and 18' containing the ends of the Bowden wires 15 and 15', secured to the control rods 16 and 16', respectively, are pivotally mounted on the dashboard 6 and carry levers 19 and 19', respectively, which are pivotally secured to connecting rods 17 and 17', for operating the dampers 14 and 14', respectively. Thus it is possible to regulate the air currents emerging from one of the two openings 11 or 12 simply by manipulating a single control rod 16 of 16' having two different modes of movement, the temperature control being effected by pushing in or pulling out the respective rod, and the amount of air supplied to the interior of the car being controlled by pivoting the same rod either upwardly or downwardly. The control mechanism for the control flap 13' and damper 14' for outlet opening 12 is shown in greater detail in Figures 4 and 5. In Figure 4, damper 14' is closed. Upon pivoting sleeve 18' upward, lever 19' will pivot to open damper as seen in Figure 5. By pulling rod 16' from the position of Figure 4 to that of Figure 5, flap 13' will open duct 10 and close duct 10'. The rods and sleeves may take any intermediate position to accordingly position the members 13' and 14' as desired. Finally, as shown in Figs. 1 and 2, it is possible either to close the air outlet from the openings 12 entirely or to direct the emerging air current in different directions into the interior of the car by providing a further air flap 20 which may be operated by a double lever 21 which is pivotally mounted on the lower side of the dashboard 6.

The heating and ventilating system illustrated in Fig. 3 differs from the one previously described only by mounting the air channels 25 and 26, or 27 and 28, respectively, within the engine compartment 29 side by side rather than one above the other. The individual channels are arranged in this embodiment of the invention so that the hot air channels 25 and 27 extend along both sides of the central engine 30, while the two ventilating air channels 26 and 28 extend along the two outer walls 31 and 31' of the engine compartment 29. This manner of arranging the individual channels constitutes an improvement over the one shown in Fig. 1 since the proximity of the hot air channels 25 and 27 to the engine 30 increases the heating effect thereof, while the ventilating air channels 26 and 26' by being spaced from the engine and lying close to the outer walls 31 and 31' of the engine compartment which are being cooled by the wind while driving, are very little affected by the heat of the engine and thus supply cooler air currents to the interior of the car. Otherwise the design and relative arrangement of the individual air openings and control elements are made substantially the same as described relative to Figs. 1 and 2.

While the foregoing description sets forth in detail what I regard as the preferred embodiment of my invention it is to be understood that numerous changes may be made therein without departing from the spirit and scope of the invention as defined in the appended claims. Thus, for example, the ventilating channels may also be provided on the outside of the engine compartment, that is, on the outside of the side walls 31 and 31', or these channels may be designed so that their outwardly directed wall portions also form a part of the side walls 31 and 31', respectively.

Having thus described my invention, what I claim as new is:

1. A heating and ventilating system for a motor vehicle with a windshield and a floor comprising means for heating and ventilating both sides of the interior of the vehicle independently of one another, said means including a pair of heating air and cold air channels on each side of the engine, each pair including at least one lower outlet into said interior of the vehicle located near the floor of the vehicle on the respective side of the vehicle and at least one upper outlet directed toward said windshield, and means connected between said channels and said outlets for combining each pair of channels of each side of the vehicle for selectively mixing the air streams flowing through said channels to enable adjustment of the upper and lower outlet of each side independent of one another to provide air streams of different temperature flowing therethrough into said interior of the vehicle.

2. A heating and ventilating system for a motor vehicle with a windshield and a floor comprising means for heating and ventilating both sides of the interior of the vehicle independently of one another, said means including a pair of heating air and cold air channels on each side of the engine, each pair including at least one lower outlet into said interior of the vehicle located near the floor of the vehicle on the respective side of the vehicle and at least one upper outlet directed toward said windshield, said heating air channels extending along the engine in close proximity thereto and said cold air channels extending along the outer walls of the engine compartment spaced from said engine, and means connected between said channels and said outlets for combining each pair of channels of each side of the vehicle for selectively mixing the air streams flowing through said channels to enable adjustment of the upper and lower outlet of each side independent of one another to provide air streams of different temperature flowing therethrough into said interior of the vehicle.

3. A heating and ventilating system for a motor vehicle with a windshield and a floor comprising means for heating and ventilating both sides of the interior of the vehicle independently of one another, said means including a pair of heating air and cold air channels on each side of the engine, each pair including at least one lower outlet into said interior of the vehicle located near the floor of the vehicle on the respective side of the vehicle and at least one upper outlet directed toward said windshield, said heating air channels extending along the engine in close proximity thereto and said cold air channels extending along the outer walls of the engine compartment spaced from said engine, means connected between said channels and said outlets for combining each pair of channels of each side of the vehicle for selectively mixing the air streams flowing through said channels to enable adjustment of the upper and lower outlet of each side independent of one another to provide air streams of different temperature flowing therethrough into said interior of the vehicle, and a single control unit for actuating said combining means of each pair of channels on each side.

4. A heating and ventilating system for a motor vehicle comprising means for heating and ventilating each side of the interior of the vehicle independently of one another, said means including a pair of heating air and cold air channels located on each side of the engine, heat exchanger means in each of the air heating channels, a pair of outlets on each side of the vehicle, a combining conduit for each outlet, a conduit means for each combining conduit connected to one cold air channel and to one heating air channel, each of a respective pair of channels, and merging into a corresponding combining conduit, and control means for each combining conduit for selectively mixing the air streams flowing through said channels to enable adjustment for the outlets of each side independent of one another to provide air streams of different temperature flowing therethrough.

5. A heating and ventilating system for a motor vehicle comprising means for heating and ventilating each side of the interior of the vehicle independently of one another, said means including a pair of air heating and cold air channels located on each side of the engine, heat exchanger means in each of the air heating channels, a pair of outlets on each side opening into the vehicle interior including at least one lower outlet and at least one upper outlet, a combining conduit for each outlet, a conduit means for each combining conduit connected to a cold air channel and to a heating air channel, each of a respective pair of channels, and merging into a corresponding combining conduit, and control means including a control flap at each merging point and a damper in each combining conduit for selectively mixing the air streams flowing through said combining conduits to enable adjustment of the upper and lower outlet of each side independent of one another to provide air streams of different temperature flowing therethrough into the interior of the vehicle.

6. A heating and ventilating system for a motor vehicle comprising means for heating and ventilating both sides of the interior of the vehicle independently of each other, said means comprising a pair of merging heating air and cooling air channels on each side of the vehicle engine, a separate conduit leading from a merger of each pair of channels, said conduits leading respectively to lower outlets opening into the vehicle interior at opposite sides thereof, another conduit leading from a merger of each pair of channels, said latter conduits leading respectively to upper outlets into the vehicle interior, a baffle at each merger of each pair of channels for selectively and individually mixing the air currents passing through said conduits, a damper in each conduit for controlling the amount of air passing therethrough, and a separate control unit for each conduit for operating the baffle and damper therefor, and means connecting said control units with respective baffles and dampers.

7. A heating and ventilating system according to claim 6, wherein said last-mentioned connecting means comprises a housing pivotally mounted on said vehicle, a rod slidable in said housing, a lever on said housing, and means for connecting said slide rod and lever with a respective baffle and damper.

8. A heating and ventilating system according to claim 7, and further including a baffle near each of said lower outlets, and means for operating said last-mentioned baffles for adjusting the direction of the air currents issuing from each of said lower outlets toward the inside of the vehicle independently of each other.

9. A heating and ventilating system for a motor vehicle having a windshield and an interior floor area comprising a pair of air channels, a heat exchanger in one of said channels for heating air therein, each of said channels having first and second outlets for passing air therefrom, said first outlets merging into a first combining conduit for directing air to the windshield, means for controlling the relative amounts of air flowing from said channels into said first conduit, means for controlling the volume of air flow in said first conduit, a manually adjustable member supported in said vehicle for two modes of movement, means interconnecting said member and said controlling means to adjust said first-mentioned controlling means upon movement of said member in one mode and for adjusting the other controlling means upon adjustment of said member in its other mode of movement, said second outlets merging into a second combining conduit for directing air to the floor area of the vehicle, third controlling means for regulating the relative amounts of air flowing from said channels into said second conduit, fourth controlling means for adjusting the volume of air flow in said second conduit, a second manually adjustable member supported in the vehicle for two modes of movement, means interconnecting said second member and said third and fourth controlling means for adjusting said third controlling means when said member is adjusted in one mode of movement and for adjusting said fourth controlling means when said second member is adjusted in its other mode of movement.

10. A heating and ventilating system according to claim 9, wherein each of said interconnecting means comprises a lever actuated by a respective manually adjustable member to adjust one of said controlling means.

11. A heating and ventilating system according to claim 9, wherein each of said manually adjustable members comprises a control rod having as its modes of movement pivotal movement and axial movement respectively, said connecting means comprising lever means operated by said rods for adjusting one of said controlling means.

References Cited in the file of this patent

UNITED STATES PATENTS

| | | |
|---|---|---|
| 2,257,967 | Le Fevre | Oct. 7, 1941 |
| 2,391,408 | Galamb et al. | Dec. 25, 1945 |
| 2,445,392 | Findley | July 20, 1948 |
| 2,492,506 | Stinnett | Dec. 27, 1949 |
| 2,612,829 | Joyce | Oct. 7, 1952 |
| 2,631,517 | Duhn | Mar. 17, 1953 |
| 2,718,839 | Wilfert | Sept. 27, 1955 |
| 2,729,158 | Wilfert | Jan. 3, 1956 |

FOREIGN PATENTS

| | | |
|---|---|---|
| 990,800 | France | June 13, 1951 |
| 171,226 | Austria | May 10, 1952 |